United States Patent
Ko et al.

(10) Patent No.: US 9,573,553 B2
(45) Date of Patent: Feb. 21, 2017

(54) AIRBAG APPARATUS

(71) Applicant: Hyundai Mobis Co., Ltd., Seoul (KR)

(72) Inventors: Seok hoon Ko, Yongin-si (KR); Hae Kwon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/751,908

(22) Filed: Jun. 26, 2015

(65) Prior Publication Data

US 2016/0121839 A1 May 5, 2016

(30) Foreign Application Priority Data

Oct. 30, 2014 (KR) .................. 10-2014-0149624

(51) Int. Cl.
  *B60R 21/207* (2006.01)
  *B60R 21/233* (2006.01)
  *B60R 21/13* (2006.01)
  *B60R 21/00* (2006.01)

(52) U.S. Cl.
  CPC ............. *B60R 21/233* (2013.01); *B60R 21/13* (2013.01); *B60R 21/207* (2013.01); *B60R 2021/0044* (2013.01); *B60R 2021/0048* (2013.01); *B60R 2021/2074* (2013.01); *B60R 2021/23308* (2013.01)

(58) Field of Classification Search
  CPC ...... B60R 21/233; B60R 21/13; B60R 21/207; B60R 2021/2074; B60R 2021/0048; B60R 2021/0044; B60R 2021/23308
  See application file for complete search history.

(56) References Cited

U.S. PATENT DOCUMENTS

| | | | | |
|---|---|---|---|---|
| 3,753,576 A | * | 8/1973 | Gorman | B60R 21/207 280/730.1 |
| 3,953,049 A | * | 4/1976 | Surace | B60R 21/08 280/730.1 |
| 4,440,443 A | * | 4/1984 | Nordskog | A47C 7/38 297/217.4 |
| 6,315,245 B1 | * | 11/2001 | Ruff | B64D 25/02 244/122 AG |
| 7,040,651 B2 | * | 5/2006 | Bossecker | B60R 21/23138 280/729 |
| 7,318,601 B2 | * | 1/2008 | Sugimoto | B60R 21/207 280/730.1 |
| 7,922,190 B2 | * | 4/2011 | Sugimoto | B60R 21/207 280/729 |
| 7,926,839 B1 | * | 4/2011 | Mothaffar | B60R 22/001 280/730.1 |

(Continued)

FOREIGN PATENT DOCUMENTS

| | | |
|---|---|---|
| JP | H06-247249 | 9/1994 |
| JP | 2013-018378 | 1/2013 |
| KR | 10-2008-0080968 | 9/2008 |

*Primary Examiner* — Paul N Dickson
*Assistant Examiner* — Timothy Wilhelm
(74) *Attorney, Agent, or Firm* — H.C. Park & Associates, PLC (57) ABSTRACT

An airbag apparatus capable of protecting an occupant using a single airbag while corresponding to various positions of a vehicle where a collision occurs. An airbag of the airbag apparatus is installed on a seatback, and deployed from an upper side of the occupant's head to a lower side of the occupant's head to surround the occupant's upper body, together with the seatback.

13 Claims, 5 Drawing Sheets (56) References Cited

U.S. PATENT DOCUMENTS

| | | | |
|---|---|---|---|
| 8,328,228 B2 * | 12/2012 | Lee | B60R 21/214 280/729 |
| 8,485,551 B2 * | 7/2013 | Dainese | B60R 21/207 280/730.1 |
| 8,579,321 B2 * | 11/2013 | Lee | B60R 21/214 280/729 |
| 8,807,593 B2 * | 8/2014 | Lee | B60R 21/213 280/730.1 |
| 9,156,426 B1 * | 10/2015 | Faruque | B60R 21/207 |
| 2008/0246264 A1 * | 10/2008 | Gerfast | B60N 2/4221 280/801.1 |
| 2013/0015642 A1 * | 1/2013 | Islam | B60R 21/207 280/730.1 |
| 2014/0327234 A1 * | 11/2014 | Heurlin | B60R 21/207 280/730.1 |

* cited by examiner

FIG. 8 ated on Oct. 30, 2014, which is hereby incorporated by reference for
AIRBAG APPARATUS

CROSS-REFERENCE TO RELATED APPLICATION

The application claims priority from and the benefit of Korean Patent Application No. 10-2014-0149624, filed on Oct. 30, 2014, which is hereby incorporated by reference for all purposes as if fully set forth herein.

BACKGROUND

Field

Exemplary embodiments relate to an airbag apparatus, and more particularly, to an airbag apparatus which is installed on a seat of a vehicle.

Discussion of the Background

In general, an airbag, which protects a seated occupant at the time of a vehicle accident, is installed in a vehicle. The airbag is inflated by gas flowing into the airbag and protects the occupant using cushioning force at the time of a vehicle accident.

A plurality of airbags may be installed at various locations in the vehicle in order to protect occupants in accordance with a position of a vehicle where a collision occurs.

The plurality of airbags may include a driver airbag, a passenger airbag, a curtain airbag, a side airbag, and the like.

The driver airbag is mounted in a steering wheel that is used to direct wheels used for steering a vehicle, thereby protecting a driver using cushioning force at the time of a frontal collision of the vehicle.

The passenger airbag is mounted at an upper side of a glove box that is used to accommodate simple articles, thereby protecting a passenger seated next to the driver using cushioning force at the time of a frontal collision of the vehicle.

The curtain airbags are installed at both sides of a roof panel, respectively, and are deployed from top to bottom at the time of a broadside collision of the vehicle or at the time of a rollover accident, and then disposed between an occupant and a door, thereby protecting the occupant's head portion using cushioning force.

The side airbag is installed at a lateral side of a seat in which an occupant is seated, and deployed toward a lateral side of the occupant at the time of a broadside collision of the vehicle, thereby protecting the lateral side of the occupant using cushioning force.

However, the airbags in the related art have a structure in which the airbag corresponding to a position of the vehicle where a collision occurs is deployed, and as a result, there is a problem in that a plurality of airbags need to be installed to protect the occupant.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an airbag apparatus capable of protecting an occupant using a single airbag while corresponding to various positions of a vehicle in which a collision occurs.

Exemplary embodiments also provide an airbag apparatus capable of preventing an occupant from separating from a seat at the time of a vehicle accident.

Additional aspects will be set forth in the detailed description which follows, and, in part, will be apparent from the disclosure, or may be learned by practice of the inventive concept.

An exemplary embodiment of the present invention discloses an airbag apparatus including: an airbag housing installed on a seatback of a seat configured to support an upper body of an occupant; and an airbag accommodated in the airbag housing, and configured to deploy to an outside of the airbag housing while being inflated when gas flows into the airbag. The airbag is deployed from an upper side of the occupant's head to a lower side of the occupant's head, and surrounds the occupant's upper body, together with the seatback.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
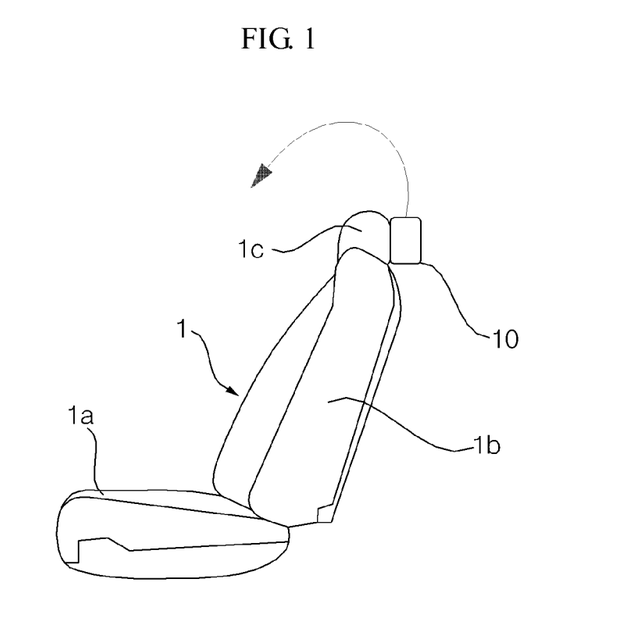
FIG. 1 is a view illustrating an example in which an airbag apparatus is installed on a seat according to an exemplary embodiment of the present invention.
Figure 2:
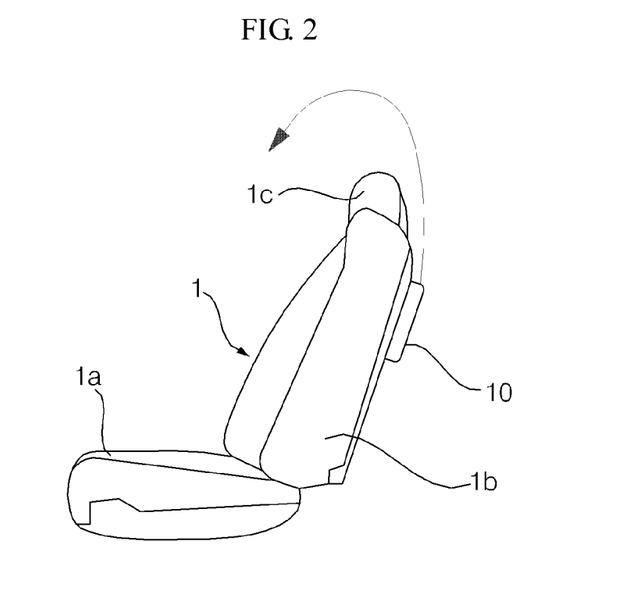
FIG. 2 is a view illustrating another example in which the airbag apparatus is installed on the seat according to an exemplary embodiment of the present invention.

Referring to FIGS. 1 and 2, an airbag apparatus according to an exemplary embodiment of the present invention includes an airbag housing 10 which is installed on a seat 1 in which an occupant is seated. The seat 1 includes a lower body support portion 1a, which supports a lower body of the occupant, and seatbacks 1b and 1c, which support an upper body of the occupant.

The seatbacks 1b and 1c include a back support portion 1b, which supports the occupant's back, and a head support portion 1c, which supports the occupant's head. The head support portion 1c is disposed at an upper side of the back support portion 1b, and the head support portion 1c may be installed to be vertically adjusted in height with respect to the back support portion 1b so that a height of the head support portion 1c may be adjusted according to a sitting height of the occupant.

As illustrated in FIG. 1, the airbag housing 10 may be installed on a rear surface of the head support portion 1c, or as illustrated in FIG. 2, the airbag housing 10 may be installed on a rear surface of the back support portion 1b.

An airbag (not illustrated) is accommodated in the airbag housing 10. The airbag may be folded in various shapes, and then accommodated in the airbag housing 10. For example, the airbag may be folded while being rolled up, and may be folded in a zigzag shape.

The airbag may be accommodated in the airbag housing 10 in a folded state, and when gas flows into the airbag, the airbag is inflated and deployed to the outside of the airbag housing 10. An inflator (not illustrated), which generates gas and supplies the generated gas into the airbag, is installed in the airbag housing 10. That is, when gas generated by the inflator flows into the airbag, the airbag may be inflated and deployed to the outside of the airbag housing 10.

Meanwhile, in a case in which the surfaces of the seatbacks 1b and 1c are made of leather or fabric, the airbag housing 10 may be installed inside of the seatbacks 1b and 1c. In this case, because the airbag needs to break through the surface of the seatbacks 1b and 1c while being inflated and protruding to the outside of the airbag housing 10, a line along which the seatbacks 1b and 1c may be able to be torn by expansive force of the airbag may be formed on the surface of the seatbacks 1b and 1c.

Figure 3:
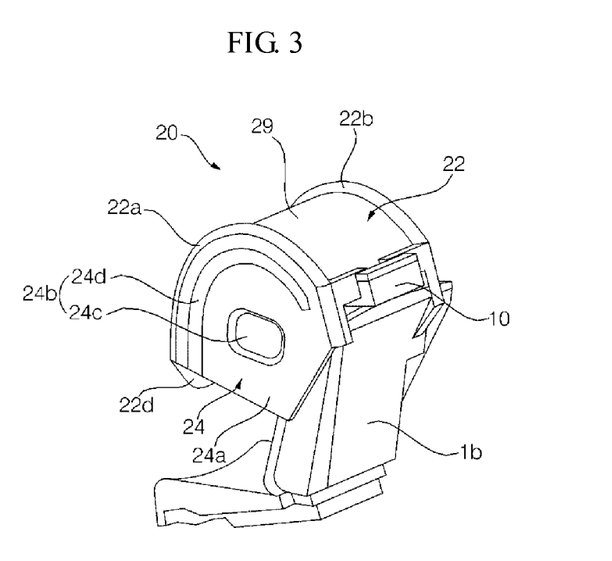
FIG. 3 is a rear perspective view illustrating a deployed state of an airbag of the airbag apparatus according to an exemplary embodiment of the present invention.
Figure 4:
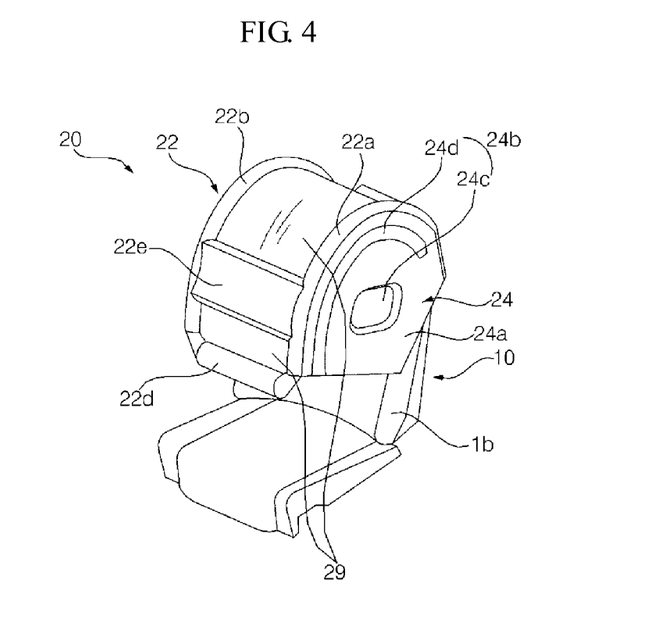
FIG. 4 is a front perspective view illustrating a deployed state of the airbag of the airbag apparatus according to an exemplary embodiment of the present invention.

FIG. 3 is a rear perspective view illustrating a deployed state of an airbag of the airbag apparatus according to an exemplary embodiment of the present invention, and FIG. 4 is a front perspective view illustrating a deployed state of the airbag of the airbag apparatus according to an exemplary embodiment of the present invention.

Referring to FIGS. 3 and 4, the airbag 20 is accommodated in the airbag housing 10, and when gas flows into the airbag 20, the airbag 20 is inflated and deployed to the outside of the airbag housing 10. The airbag 20 is deployed from an upper side of the head of the occupant seated in the seat 1 to a lower side of the occupant's head, and then surrounds the upper body of the occupant together with the seatbacks 1b and 1c. That is, when the airbag 20 is deployed, the upper body of the occupant is positioned in an internal space that is defined by the airbag 20 and the seatbacks 1b and 1c. When the airbag 20 is deployed, the internal space, which is defined by the airbag 20 and the seatbacks 1b and 1c, opens in a downward direction.

As such, the airbag 20 is deployed and surrounds the occupant seated in the seat 1 together with the seatbacks 1b and 1c, such that the airbag 20 may inhibit the occupant from moving forward, upward, leftward, and rightward at the time of a vehicle accident, and may protect a front side, an upper side, a left side, and a right side of the occupant using gas in the airbag 20 and cushioning force. The seatbacks 1b and 1c inhibit the occupant from being moved rearward.

The airbag 20 includes a rollover portion 22 which is disposed at a center position and protects the upper side and the front side of the occupant, and side portions 24 which are coupled to both lateral sides of the rollover portion 22, respectively, and protect both lateral sides of the occupant. FIGS. 3 and 4 illustrate only the side portion 24 coupled to the left side of the rollover portion 22, but a side portion 24, which is identical to the side portion 24 coupled to the left side of the rollover portion 22, is also coupled to the right side of the rollover portion 22.

The rollover portion 22 is coupled to the inflator and inflated by being supplied with gas from the inflator. The side portions 24 are in communication with the rollover portion 22, and inflated with gas supplied from the rollover portion 22. That is, gas generated by the inflator first flows into the rollover portion 22 disposed at the center position and allows the rollover portion 22 to be inflated. The gas then flows into the side portions 24, which are disposed at both lateral sides of the rollover portion 22, respectively, and allows the side portions 24 to be inflated, thereby allowing the airbag 20 to be deployed from the upper side of the occupant's head to the lower side of the occupant's head while preventing the airbag 20 from being tilted leftward or rightward.

Figure 5:
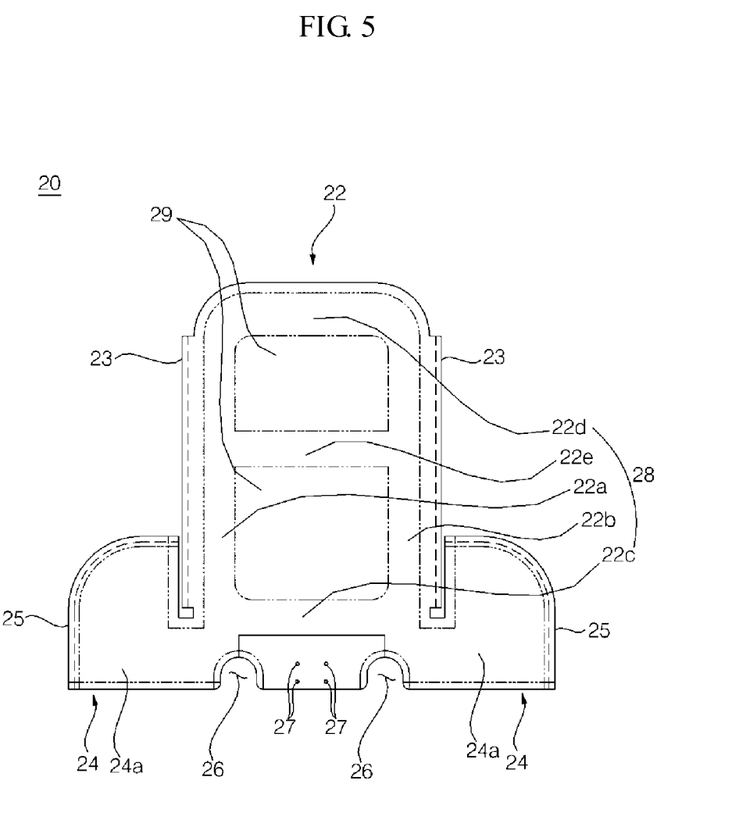
FIG. 5 is a view illustrating a state in which the airbag of the airbag apparatus is spread before being manufactured according to an exemplary embodiment of the present invention.

FIG. 5 is a view illustrating a state in which the airbag 20 of the airbag apparatus is spread before being manufactured according to an exemplary embodiment of the present invention.

The airbag 20 is manufactured after having a shape as illustrated in FIG. 5 by stacking two flexible panels having the same shape, and sewing together circumferences of the two panels so as to form a chamber, which may be filled with gas, between the two panels. A portion, which is disposed at the center position of FIG. 5, is a portion that will become the rollover portion 22 later, and portions, which are disposed at left and right sides of FIG. 5, are portions that will become the side portions 24 later. In FIG. 5, the portion, which will become the rollover portion 22 later, will be referred to as the rollover portion 22, and the portions, which will become the side portions 24 later, will be referred to as the side portions 24.

Referring to FIG. 5, first sewing portions 23, which are sewed on and coupled to the side portions 24, protrude at both sides of the rollover portion 22. Second sewing portions 25, which are sewed on and coupled to the first sewing portions 23, protrude at portions except for the rear portions of the side portions 24. As the first sewing portions 23 and the second sewing portions 25 are sewed and coupled together, the airbag 20 having a shape illustrated in FIGS. 3 and 4 is manufactured.

As such, the first sewing portions 23 and the second sewing portions 25 are sewed and coupled together, and a rear end of the rollover portion 22 and rear ends of the side portions 24 are disposed in a straight line in a left and right direction, such that when the airbag 20 is completely manufactured, a rear end and a lower end of the airbag 20 are opened. Therefore, while the airbag 20 is deployed from the upper side of the occupant's head to the lower side of the occupant's head, the opened rear end of the airbag 20 is shielded by the seatbacks 1b and 1c, and an internal space is formed between the airbag 20 and the seatbacks 1b and 1c. Further, the occupant's head is first inserted into the internal space through the opened lower end of the airbag 20, and the airbag 20 and the seatbacks 1b and 1c surround the upper body of the occupant.

Meanwhile, two inflator insertion ports 26, into which head portions of the inflator are inserted, are formed at the rear end of the rollover portion 22. That is, the head portions of the inflator are inserted and disposed into the two inflator insertion ports 26, respectively, such that the inflator may supply gas into the rollover portion 22.

Four fastening holes 27 for fastening the airbag 20 to the airbag housing 10 are formed at the rear end of the rollover portion 22. Fastening members, such as bolts, are inserted into the four fastening holes 27, such that the rollover portion 22 may be coupled to the airbag housing 10.

Referring to FIGS. 3 to 5, the rollover portion 22 includes an expandable portion 28 which expands when gas flows into the expandable portion 28, and a non-expandable portion 29 which does not expand because gas does not flow into the non-expandable portion 29. The reason why the non-expandable portion 29 is formed in the rollover portion 22 is to use a low capacity inflator that generates a small amount of gas. In particular, because a high capacity inflator, which generates a large amount of gas, has a large size, a space on the seatbacks 1b and 1c is insufficient to install the airbag housing 10 having the high capacity inflator, and it is difficult to install the airbag housing 10 having the high capacity inflator on the seatbacks 1b and 1c. Therefore, the low capacity inflator may be used by forming the non-expandable portion 29 in the rollover portion 22.

The expandable portion 28 may be formed in the rollover portion 22 corresponding to positions of the occupant's face and chest, thereby protecting the occupant's face and chest using cushioning force at the time of a frontal collision of the vehicle.

The rollover portion 22 prevents the occupant's head from deviating from the seat at the time of a rollover accident of the vehicle. Because the rollover portion 22 works well as long as the rollover portion 22 inhibits the occupant's head from being moved and prevents the occupant's head from deviating from the seat, the non-expandable portion 29 may be formed at a portion where cushioning force is not necessary. In the present exemplary embodiment, the non-expandable portion 29 is disposed inside the expandable portion 28, such that at the time of a rollover accident of the vehicle, the non-expandable portion 29 inhibits the occupant's head from being moved upward, and prevents the occupant's head from deviating from the seat.

The expandable portion 28 includes a first expandable portion 22a, a second expandable portion 22b, a third expandable portion 22c, a fourth expandable portion 22d, and a fifth expandable portion 22e. The first expandable portion 22a is disposed at a left side of the non-expandable portion 29, and formed to be elongated in a front and rear direction. The second expandable portion 22b is disposed at a right side of the non-expandable portion 29, and formed to be elongated in the front and rear direction. The third expandable portion 22c is disposed at a rear side of the non-expandable portion 29, and formed to be elongated in a left and right direction. The fourth expandable portion 22d is disposed at a front side of the non-expandable portion 29, and formed to be elongated in the left and right direction. The fifth expandable portion 22e is disposed between the third expandable portion 22c and the fourth expandable portion 22d, and formed to be elongated in the left and right direction.

The third expandable portion 22c is a portion that is supplied with gas from the inflator, and allows one end of the first expandable portion 22a, one end of the second expandable portion 22b, and the side portions 24 to be in communication with one another. Further, the fourth expandable portion 22d allows the other end of the first expandable portion 22a and the other end of the second expandable portion 22b to be in communication with each other. Further, the fifth expandable portion 22e allows the first expandable portion 22a and the second expandable portion 22b to be in communication with each other.

Gas flowing into the third expandable portion 22c from the inflator flows into the first expandable portion 22a and the second expandable portion 22b, and flows into the side portions 24. Therefore, in the airbag 20, the third expandable portion 22c expands first, and thereafter, the first expandable portion 22a, the second expandable portion 22b, and both of the side portions 24 begin to expand from the rear side to the front side by gas flowing from the third expandable portion 22c. Thereafter, the fifth expandable portion 22e expands, and the fourth expandable portion 22d expands finally, such that the airbag 20 may be deployed from the upper side of the occupant's head to the lower side of the occupant's head while being deployed from the rear side to the front side.

The first expandable portion 22a and the second expandable portion 22b serve to guide gas, which flows into the third expandable portion 22c from the inflator, to the fifth expandable portion 22e and the fourth expandable portion 22d. Further, when the vehicle collides with an object obliquely with respect to the front and rear direction, and whereby the occupant is moved in a diagonal direction with respect to the front and rear direction, the first expandable portion 22a and the second expandable portion 22b also serve to protect the occupant's upper body using cushioning force.

When the airbag 20 is deployed, the fourth expandable portion 22d corresponds to the position of the occupant's chest, thereby protecting the occupant's chest using cushioning force. Further, when the airbag 20 is deployed, the fifth expandable portion 22e corresponds to the position of the occupant's head, thereby protecting the occupant's face using cushioning force. When the airbag 20 is deployed, the fourth expandable portion 22d may be disposed below the side portions 24, as illustrated in FIGS. 3 and 4.

Meanwhile, as illustrated in FIGS. 3 and 4, the side portion 24 may include an expandable portion 24a which expands when gas flows into the expandable portion 24a from the rollover portion 22, and a non-expandable portion 24b which does not expand because gas does not flow into the non-expandable portion 24b. In addition, as illustrated in FIG. 5, the side portion 24 may be formed with only the expandable portion 24a that expands when gas flows into the expandable portion 24a from the rollover portion 22.

As illustrated in FIGS. 3 and 4, in a case in which the side portion 24 includes the expandable portion 24a and the non-expandable portion 24b, the non-expandable portion 24b may include a first non-expandable portion 24c which is disposed inside the expandable portion 24a, and a second non-expandable portion 24d which is coupled to the rollover portion 22.

Figure 6:
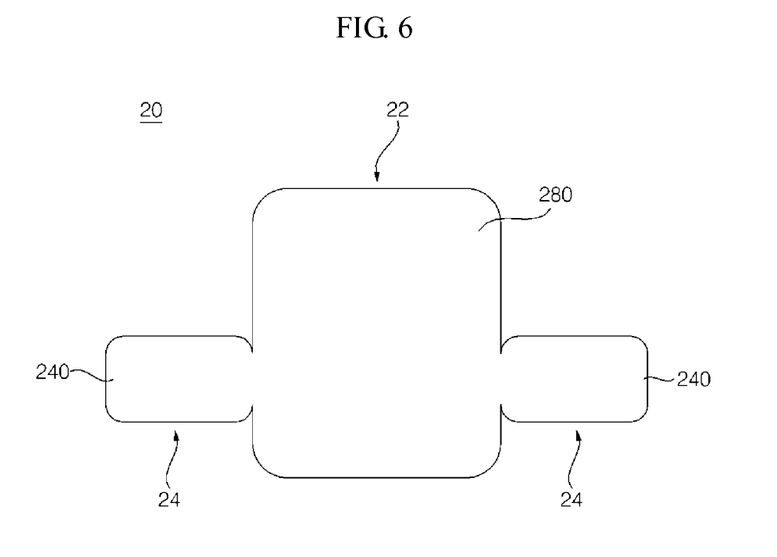
FIG. 6 is a view illustrating a state in which an airbag of an airbag apparatus is spread before being manufactured according to another exemplary embodiment of the present invention.

FIG. 6 is a view illustrating a state in which an airbag of an airbag apparatus is spread before being manufactured according to another exemplary embodiment of the present invention. Hereinafter, like reference numerals refer to constituent elements identical to those of the aforementioned first exemplary embodiment, a description thereof will be omitted, and only the differences between the exemplary embodiments will be described.

Referring to FIG. 6, it can be seen that an airbag 20 of the airbag apparatus according to another exemplary embodiment of the present invention differs from the previously-described exemplary embodiment. That is, in the previously-described exemplary embodiment, the rollover portion 22 includes the expandable portion 28 and the non-expandable portion 29, but in the present exemplary embodiment, the rollover portion 22 includes only an expandable portion 280 that expands when gas flows into the expandable portion 280 from the inflator. Further, the side portion 24 also includes only an expandable portion 240 which expands when gas flows into the expandable portion 240 from the expandable portion 280.

Figure 7:
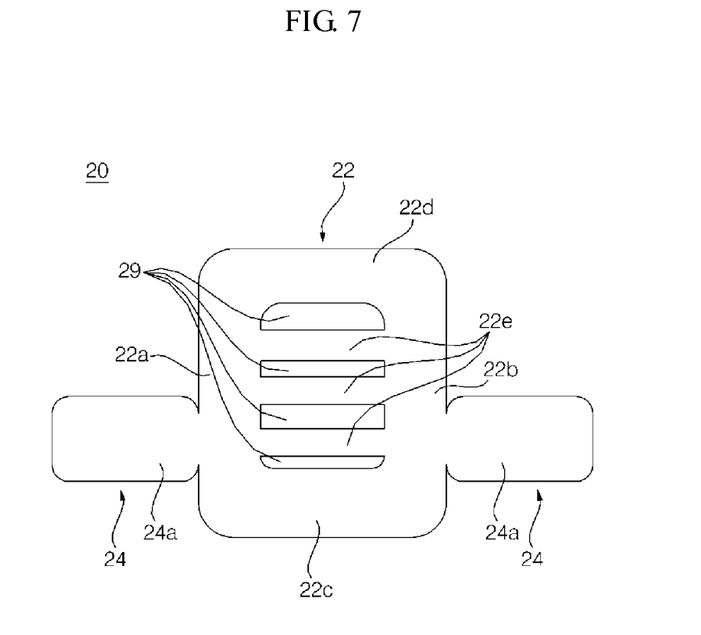
FIG. 7 is a view illustrating a state in which an airbag of an airbag apparatus is spread before being manufactured according to still another exemplary embodiment of the present invention.

FIG. 7 is a view illustrating a state in which an airbag of an airbag apparatus is spread before being manufactured according to still another exemplary embodiment of the present invention. Hereinafter, like reference numerals refer to constituent elements identical to those of the first-mentioned exemplary embodiment, a description thereof will be omitted, and only the differences between the exemplary embodiments will be described.

Referring to FIG. 7, an airbag 20 of the airbag apparatus according to this exemplary embodiment of the present invention differs from the airbag of the airbag apparatus according to the first-mentioned exemplary embodiment. That is, in the first-mentioned exemplary embodiment, only the single fifth expandable portion 22e is formed, but in the present exemplary embodiment, a plurality of fifth expandable portions 22e are formed.

Figure 8:
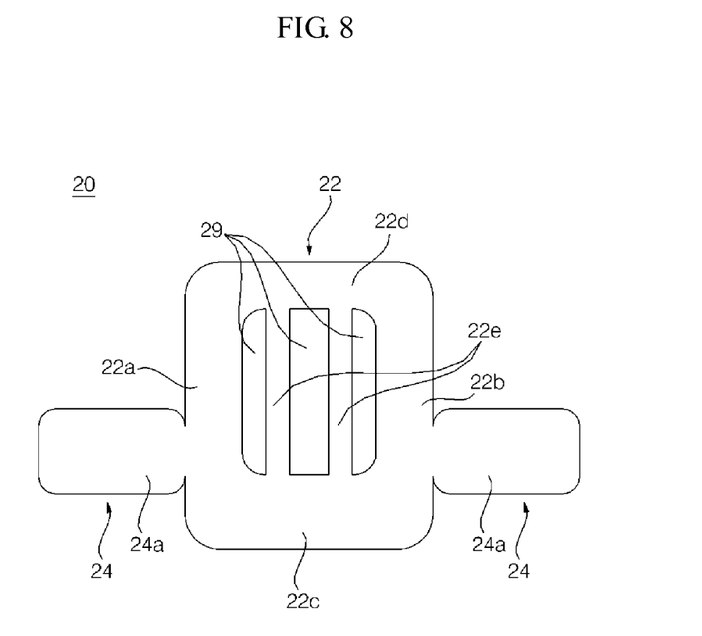
FIG. 8 is a view illustrating a state in which an airbag of an airbag apparatus is spread before being manufactured according to still another exemplary embodiment of the present invention.

FIG. 8 is a view illustrating a state in which an airbag of an airbag apparatus according to still another exemplary embodiment of the present invention is spread before being manufactured. Hereinafter, like reference numerals refer to constituent elements identical to those of the first-mentioned exemplary embodiment, a description thereof will be omitted, and only the differences between the exemplary embodiments will be described.

Referring to FIG. 8, it can be seen that an airbag 20 of the airbag apparatus according to this exemplary embodiment of the present invention differs from the airbag of the airbag apparatus according to the first-mentioned exemplary embodiment. That is, in the first-mentioned exemplary embodiment, the fifth expandable portion 22e is formed to be elongated in the left and right direction, but in the present exemplary embodiment, the fifth expandable portion 22e is disposed to be elongated in the front and rear direction.

That is to say, the fifth expandable portion 22e is disposed between the first expandable portion 22a and the second expandable portion 22b, and allows the third expandable portion 22c and the fourth expandable portion 22d to be in communication with each other. In this case, gas flowing into the third expandable portion 22c from the inflator flows into the first expandable portion 22a, the second expandable portion 22b, and the side portions 24, and at nearly the same time, the gas flows into the fifth expandable portion 22e, thereby increasing force by which the rollover portion 22 is deployed forward.

The number of fifth expandable portions 22e may be one or more than one. In the present exemplary embodiment, two fifth expandable portions 22e are formed.

According to the airbag apparatus according to exemplary embodiments of the present invention as described above, the airbag 20, together with the seatbacks 1b and 1c, surrounds the occupant seated in the seat 1 to protect the occupant at the time of a vehicle accident, thereby preventing the occupant from deviating from the seat 1, and safely protecting the occupant even at the time of a complex collision of the vehicle or a rollover accident.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An airbag apparatus comprising:
an airbag housing installed on a seatback of a seat configured to support an occupant's upper body; and
an airbag accommodated in the airbag housing, and configured to be deployed to an outside of the airbag housing while being inflated when gas flows into the airbag,
wherein:
the airbag is configured to be deployed from an upper side of the occupant's head to a lower side of the occupant's head, and surrounds the occupant's upper body, together with the seatback;
the airbag comprises:
a rollover portion that protects an upper side and a front side of the occupant; and
side portions that are coupled to both lateral sides of the rollover portion, and protect both lateral sides of the occupant;
the rollover portion comprises an expandable portion that is configured to expand when gas flows into the expandable portion, and a non-expandable portion; and
the expandable portion comprises:
a first expandable portion disposed at a first side of the non-expandable portion;
a second expandable portion disposed at a second side of the non-expandable portion opposite the first side;
a third expandable portion which allows one end of the first expandable portion, one end of the second expandable portion, and the side portions to be in communication with one another;
a fourth expandable portion which allows the other end of the first expandable portion and the other end of the second expandable portion to be in communication with each other; and
a fifth expandable portion disposed between the third expandable portion and the fourth expandable portion, and allows the first expandable portion and the second expandable portion to be in communication with each other.

2. The airbag apparatus of claim 1, wherein the airbag housing is installed on one of a back support portion of the seatback which supports the occupant's back, and a head support portion of the seatback which supports the occupant's head.

3. The airbag apparatus of claim 1, wherein an inflator, which generates gas, is coupled to the rollover portion, and the side portions are in communication with the rollover portion and configured to be supplied with gas from the rollover portion.

4. The airbag apparatus of claim 1, wherein the non-expandable portion is disposed inside the expandable portion.

5. The airbag apparatus of claim 1, wherein the third expandable portion is configured to expand first by being supplied with gas from the inflator, and the fifth expandable portion and the fourth expandable portion are configured to expand while the first expandable portion, the second expandable portion, and the side portions expand from the rear side to the front side by gas flowing from the third expandable portion, such that the airbag is configured to be deployed from the upper side of the occupant's head to the lower side of the occupant's head while being deployed from the rear side to the front side.

6. The airbag apparatus of claim 1, wherein when the airbag is deployed, the fourth expandable portion is disposed below the side portion.

7. The airbag apparatus of claim 1, wherein when the airbag is deployed, the fourth expandable portion corresponds to a position of the occupant's chest, and the fifth expandable portion corresponds to a position of the occupant's head.

8. The airbag apparatus of claim 1, further comprising a plurality of fifth expandable portions.

9. The airbag apparatus of claim 1, wherein the side portion comprises:
an expandable portion configured to expand when gas flows into the expandable portion from the rollover portion; and
a non-expandable portion.

10. The airbag apparatus of claim 9, wherein the non-expandable portion comprises:
a first non-expandable portion disposed inside the expandable portion; and
a second non-expandable portion which is coupled to the rollover portion.

11. An airbag apparatus comprising:
an airbag housing installed on a seatback of a seat configured to support an occupant's upper body; and
an airbag accommodated in the airbag housing, and configured to be deployed to an outside of the airbag housing while being inflated when gas flows into the airbag,
wherein:
the airbag is configured to be deployed from an upper side of the occupant's head to a lower side of the occupant's head, and surrounds the occupant's upper body, together with the seatback:
the airbag comprises:
a rollover portion that protects an upper side and a front side of the occupant; and
side portions that are coupled to both lateral sides of the rollover portion, and protect both lateral sides of the occupant;
the rollover portion comprises an expandable portion that is configured to expand when gas flows into the expandable portion, and a non-expandable portion; and
the expandable portion comprises:
a first expandable portion disposed at a first side of the non-expandable portion;
a second expandable portion which is disposed at a second side of the non-expandable portion opposite the first side;
a third expandable portion which allows one end of the first expandable portion, one end of the second expandable portion, and the side portions to be in communication with one another;
a fourth expandable portion which allows the other end of the first expandable portion and the other end of the second expandable portion to be in communication with each other; and
a fifth expandable portion disposed between the first expandable portion and the second expandable portion, and allows the third expandable portion and the fourth expandable portion to be in communication with each other.

12. The airbag apparatus of claim 11, wherein when the airbag is deployed, the fourth expandable portion corresponds to a position of the occupant's chest, and the fifth expandable portion corresponds to a position of the occupant's head.

13. The airbag apparatus of claim 11, further comprising a plurality of fifth expandable portions.

* * * * *